United States Patent
Suzuki

(10) Patent No.: US 6,243,140 B1
(45) Date of Patent: Jun. 5, 2001

(54) METHODS AND APPARATUS FOR REDUCING THE AMOUNT OF BUFFER MEMORY REQUIRED FOR DECODING MPEG DATA AND FOR PERFORMING SCAN CONVERSION

(75) Inventor: Norihiro Suzuki, Cupertino, CA (US)

(73) Assignee: Hitachi America, Ltd, Tarrytown, NY (US)

(*) Notice: Subject to any disclaimer, the term of this patent is extended or adjusted under 35 U.S.C. 154(b) by 0 days.

(21) Appl. No.: 09/251,451

(22) Filed: Feb. 17, 1999

Related U.S. Application Data

(60) Provisional application No. 60/097,581, filed on Aug. 24, 1998.

(51) Int. Cl.[7] ................. H04N 7/01; H04N 9/64
(52) U.S. Cl. ............. 348/448; 348/452; 348/715; 375/240.12
(58) Field of Search .................. 348/448, 451, 348/452, 441, 446, 458, 443, 715, 402.1, 407.1, 409.1–413.1, 416.1, 424.1; 375/240.12–240.16

(56) References Cited

U.S. PATENT DOCUMENTS

| | | | |
|---|---|---|---|
| 4,706,121 | 11/1987 | Young | 358/142 |
| 5,428,397 * | 6/1995 | Lee | 348/448 |
| 5,495,300 * | 2/1996 | De Haan et al. | 348/669 |
| 5,508,747 * | 4/1996 | Lee | 348/441 |
| 5,614,940 | 3/1997 | Cobbley et al. | 348/7 |
| 5,617,565 | 4/1997 | Augenbraun et al. | 395/604 |
| 5,666,293 | 9/1997 | Metz et al. | 395/200.5 |
| 5,777,682 * | 7/1998 | De Haan et al. | 348/452 |
| 5,796,437 * | 8/1998 | Muraji et al. | 348/452 |
| 5,808,694 | 9/1998 | Usui et al. | 348/569 |
| 5,818,441 | 10/1998 | Throckmorton et al. | 345/328 |
| 5,864,368 * | 1/1999 | Kato et al. | 348/446 |
| 5,886,745 * | 3/1999 | Muraji et al. | 348/441 |
| 5,946,040 * | 8/1999 | Kato et al. | 348/416 |
| 5,949,489 * | 9/1999 | Nishikawa et al. | 348/412 |
| 6,025,878 * | 2/2000 | Boyce et al. | 348/402 |
| 6,067,321 * | 5/2000 | Lempel | 349/420 |

FOREIGN PATENT DOCUMENTS

| | | |
|---|---|---|
| WO 96/37996 | 11/1996 | (WO). |
| WO 98/03016 | 1/1998 | (WO). |
| WO 98/17063 | 4/1998 | (WO). |

* cited by examiner

Primary Examiner—Reinhard J. Eisenzopf
Assistant Examiner—Brian P. Yenke
(74) Attorney, Agent, or Firm—Straub & Pokotylo; Michael P. Straub

(57) ABSTRACT

Methods and apparatus for reducing the total amount of memory required to implement a video decoder and to perform a scan conversion operation on decoded video are described. In accordance with the present invention this is accomplished by having an interlaced to progressive (I-P) conversion circuit utilize the same frame memory used to decode the images upon which a conversion operation is performed. In this manner, the images, e.g., frames, which are buffered in the decoder are utilized by both the decoder and I-P conversion circuit thereby eliminating the need for the I-P conversion circuit to be supported with an independent frame memory. Data included in a decoder's frame memories is used to detect moving image areas for purposes of the I-P conversion process. In a specific exemplary embodiment, one of three frames, which is nearest to a present frame, is referred for calculating frame difference signals. Both subsequent and preceding frames are used to detect motion for I-P conversion purposes. This approach eliminates the need for a separate frame memory for motion detection purposes. Using the above discussed memory saving techniques, I-P conversion can be performed in accordance with the present invention by sharing the anchor frame memories and B-frame buffer present in a conventional decoder for both decoding and I-P conversion.

27 Claims, 11 Drawing Sheets

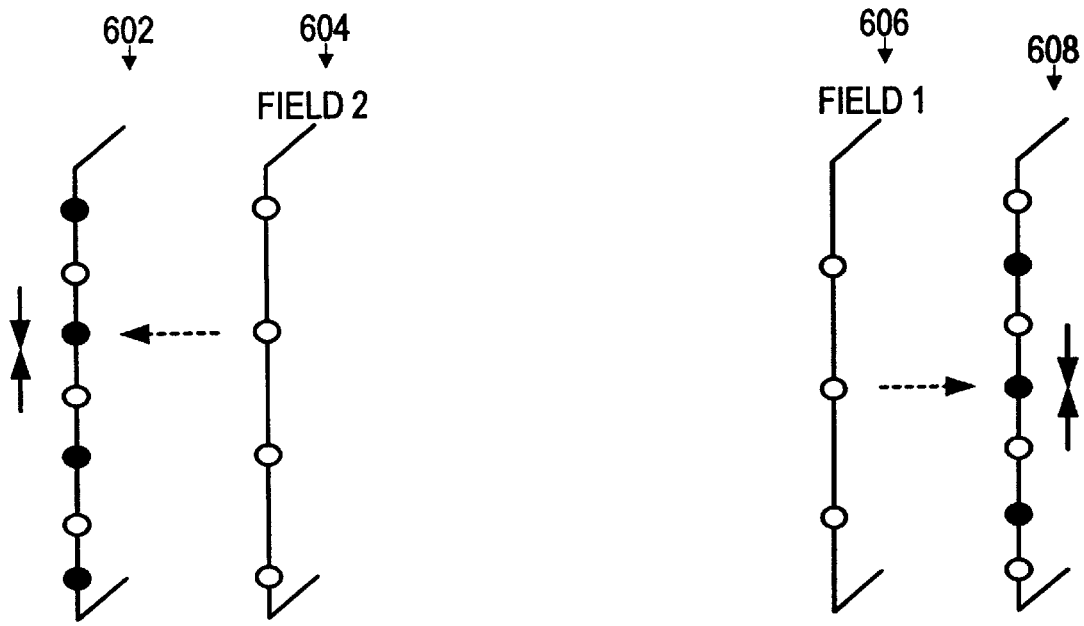
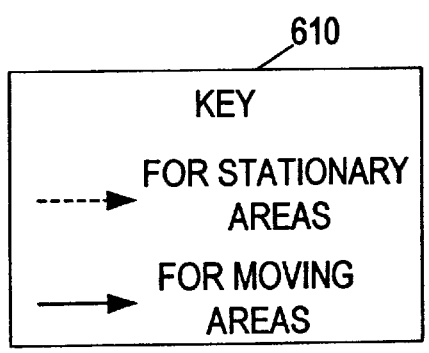
FIGURE 6B
FIGURE 6A

METHODS AND APPARATUS FOR REDUCING THE AMOUNT OF BUFFER MEMORY REQUIRED FOR DECODING MPEG DATA AND FOR PERFORMING SCAN CONVERSION

RELATED APPLICATIONS

This application claims the benefit of U.S. Provisional Application No. 60/097,581, filed Aug. 24, 1998.

FIELD OF THE INVENTION

The present invention relates to video data processing and, more particularly, to reducing the amount of buffer memory required to perform a decoding and format conversion operation.

BACKGROUND OF THE INVENTION

MPEG2 is a standard which has been proposed for the digital encoding of television signals. MPEG2 allows for signals to be encoded on either an interlaced or progressive basis.

The term interlaced is used to refer to image data that is represented using, e.g., two alternating image fields. One field of an interlaced video frame normally corresponds to the odd lines of pixels in the frame with the other field corresponding to the even lines of the frame. During display, the lines of one field are scanned, e.g., output to a display device. The lines of the second field are then scanned, so that they are interlaced on the display device with the lines of the first field. In this manner, when interlaced images are displayed, odd and even lines of image data are updated on an alternating basis.

In the case of progressive image data, image data is displayed sequentially, e.g., starting at the top left corner of an image proceeding to the bottom right corner. Thus, in the progressive image case, the lines of an image are displayed or updated on a sequential basis without lines being skipped.

In a series of progressive images, the positioning of the horizontal display lines is consistent from image to image. Accordingly, each newly displayed progressive image normally will completely replace the previous image on a display assuming that the images are the same size. In the case of interlaced images, each frame includes two fields which correspond to spatially different, e.g., horizontal odd and even lines, of a display device. Accordingly, in the case of interlaced images, each field updates only a portion of the displayed image. Because fields of an interlaced image normally correspond to images at different times, merely combining fields 1 and 2 of an interlaced frame can cause blurring and other image distortions when motion is present. For this reason, conversion of interlaced images to progressive images normally involves some form of motion detection and the application of processing which is a function of detected motion.

Presently television images are usually encoded to be displayed as interlaced images. Unfortunately, most computers are designed to display progressively scanned images.

The ability to efficiently convert between interlaced and progressive image formats continues to increase in importance due, in part, to the ever increasing use of computers. Notably, when television scenes or other data represented as interlaced images are to be displayed on a computer, they normally first have to be converted into progressive image data.

High speed memory is normally used in video processing applications which convert between image formats. This is so that real time, or near real time, processing of video data can be achieved. While the cost of memory has dropped considerably in recent years, memory still remains a significant cost component of many image and video processing systems. This is because a relatively large amount of memory is normally required for video applications. In consumer applications and other applications where cost is a concern, it is desirable to minimize the amount of memory required to implement an image processing system or device.

A known MPEG2 decoder 100 followed by a conventional interlace to progressive (I-P) scan converter 110 is illustrated in FIG. 1. The (I-P) scan converter 110 operates to convert interlaced image data into progressive image data. Switching between intra-field and inter-field interpolation is performed in the system of FIG. 1 as a function of detected motion in the image represented by the video data being decoded.

A frame memory includes sufficient memory to store data representing an entire frame. Known MPEG2 decoders such as the decoder 100 normally use three frame memories, a first anchor frame memory 102, a second anchor frame memory 104 and a B-frame buffer 106 to decode MPEG 2 data as shown in FIG. 1. The conventional I-P converter 110 which follows the MEPG2 decoder in FIG. 1 uses an additional frame memory 112 for interpolation and motion detection purposes. Accordingly, a conventional MPEG2 decoder 100 followed by an I-P converter 110 normally requires a total of four frame memories.

In order to reduce the cost of video systems which perform decoding and conversion operations, there is a need for methods and apparatus which allow for a reduction in the amount of memory required to implement such systems. It is desirable that any new methods and apparatus be suitable for implementation in computer systems as well as televisions sets, set top boxes and other video applications.

SUMMARY OF THE PRESENT INVENTION

The present invention reduces the total amount of memory required to perform decoding and scan conversion operations, as compared to known decoding and scan conversion devices. This desirable result is achieved without significantly affecting video quality.

The reduction in required memory achieved by the present invention is accomplished by having an I-P conversion circuit utilize the same frame memory used to decode the images upon which a conversion operation is being performed.

In an exemplary MPEG2 decoding embodiment, anchor frame memories for storing I and P frames, and a B-frame buffer are implemented in a common memory device. This memory device is used for both decoder and scan conversion purposes. During I-P conversion difference signals between a present and a previous or a present frame and a subsequent frame, are used for motion detection. Inter-field interpolation requires a field delayed signal. Notably, in accordance with the present invention, the same frame memory used for decoding is used to provide the field delayed signal used during I-P conversion.

Thus, the present invention utilizes data included in decoder frame memories to detect moving areas for purposes of the I-P conversion process thereby avoiding the need for a separate I-P conversion frame memory.

In a specific exemplary embodiment, one of three frames, which is nearest to a present frame, is referenced for calculating frame difference signals, e.g., for motion detection purposes. In such an embodiment, a preceding or subsequent frame in a decoded video sequence, or field included therein, may be used for motion detection purposes. This is in contrast to known interlaced to progressive conversion systems which use only preceding decoded video frame data for motion detection purposes. Using data from subsequent frames for motion detection purposes allows frames stored in decoder memory, e.g., for use as reference frames for motion compensated prediction purposes, to be used for motion detection during the I-P conversion process of the present invention. The use of subsequent frame data for motion detection purposes facilitates the elimination of a separate frame memory dedicated to I-P conversion motion detection.

In an exemplary embodiment, interpolation processing is executed in a frame, e.g., a pair of fields, on an inter-field basis. By limiting interpolation to within a frame, and by using the above discussed motion detection technique the need for a separate frame memory for interpolation purposes is eliminated and the existing decoder frame memories can be used for I-P conversion.

Using the above discussed memory saving techniques, I-P conversion can be performed in accordance with the present invention without requiring addition frame memories beyond the number already present in a conventional decoder.

BRIEF DESCRIPTION OF THE DRAWINGS

FIG. 6 illustrates interpolation performed in accordance with the present invention as part of the I-P conversion process.

DETAILED DESCRIPTION

Figure 2A:
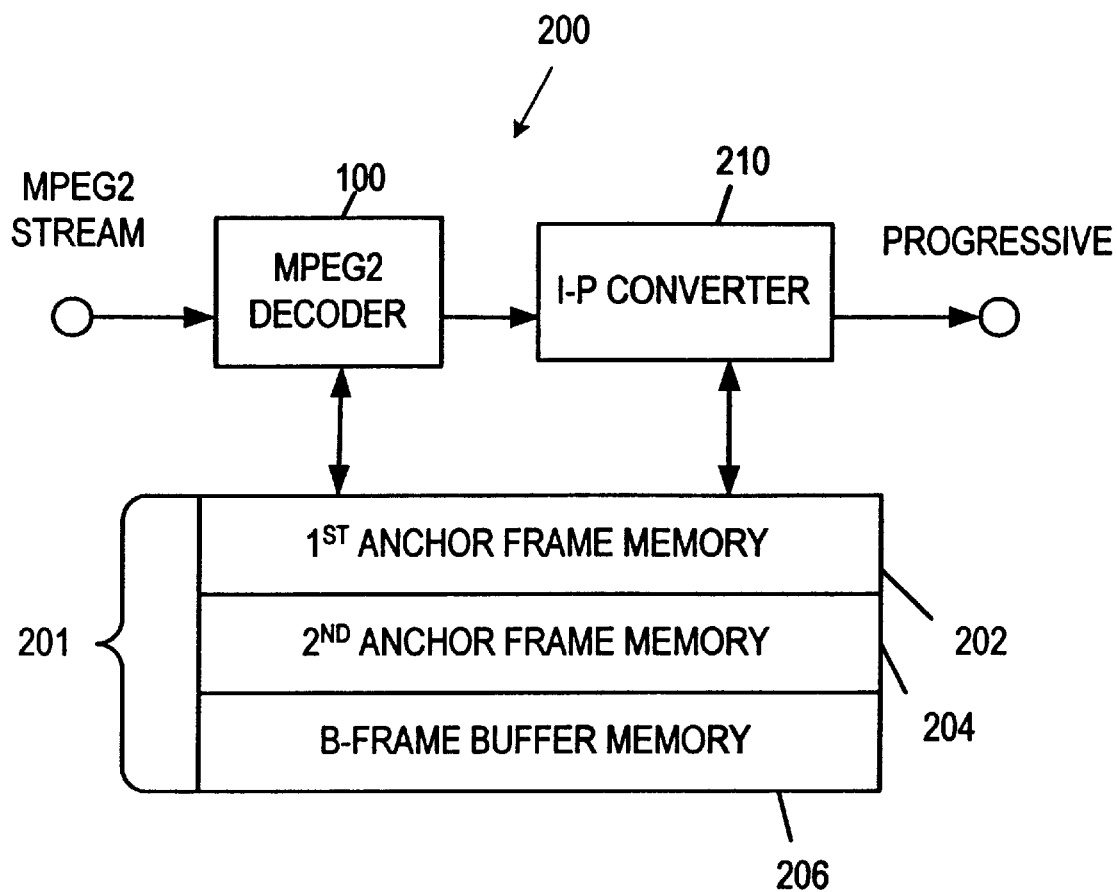
FIG. 2A illustrates a decoder and an I-P converter, implemented in accordance with the present invention, which share a set of common frame memories.
Figure 2B:
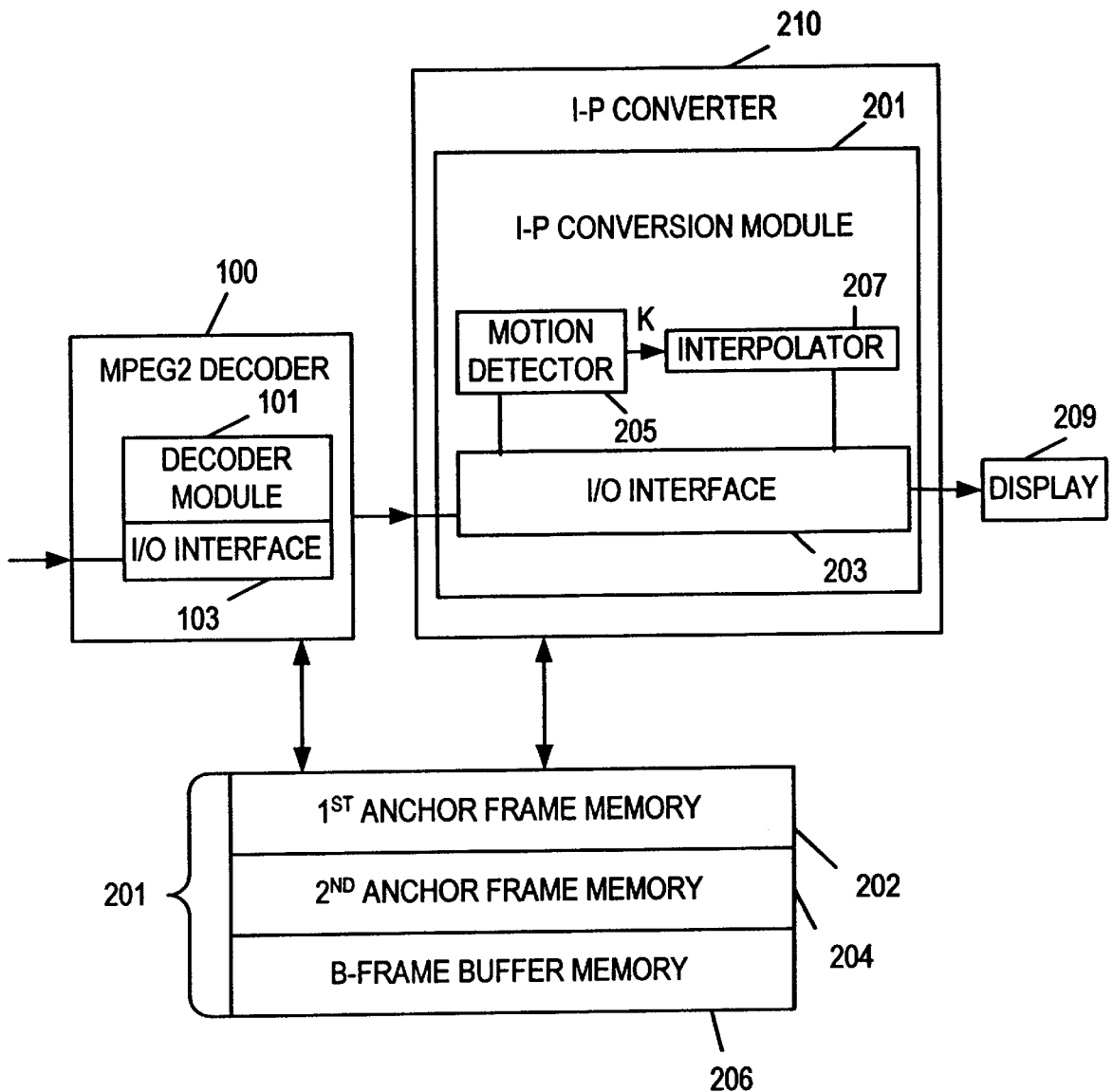
FIG. 2B illustrates the apparatus of FIG. 2A in greater detail.

FIGS. 2A and 2B illustrate a decoder/I-P conversion apparatus 200 implemented in accordance with the present invention. As illustrated, the apparatus 200 comprises a video decoder, e.g., an MPEG 2 decoder 100, an interlaced to progressive (I-P) image converter 210, and a common memory 201 which includes a first anchor frame memory 202, a $2^{nd}$ anchor frame memory 204 and a B-frame buffer memory 206. The decoder uses the $1^{st}$ and $2^{nd}$ frame memories 202, 204 for storing anchor frames, e.g., intra-coded (I) and predictively coded (P) frames respectively. The B-frame buffer is used by the decoder 100 for storing B frames so that they can be output in the proper decoded frame sequence with the generated decoded I and P frames.

In accordance with the present invention, the I-P converter 210 utilizes the memory 201 to obtain frame data used for motion detection purposes. Various I, P and B frames are stored in the memories 202, 204, 206, respectively, to support decoding operations, e.g., motion compensated prediction and frame re-sequencing prior to outputting the decoded video. The I-P converter 210 of the present invention uses, as reference data for motion detection purposes, reference frame data which is already present in the $1^{st}$ and $2^{nd}$ frame memories 202, 204 for use as decoding reference frame data. It also uses various B frames, some of which are maintained in the buffer 206, in accordance with the present invention, slightly longer than would be required simply for decoder frame re-sequencing. In this manner, the need to provide a separate frame memory to store data for I-P conversion motion detection purposes is avoided. Notably, the data stored in the frame memories 202, 204, 206 need not be recopied or moved to a different location in the memory 201 to be used by I-P converter after use by the decoder 100. Accordingly, memory management is simplified as opposed to the known system where data to be used for motion detection purposes must be copied or stored in a separate I-P frame memory for use in I-P conversion motion estimation.

FIG. 2B illustrates the device 200 of the present invention in greater detail. As illustrated in FIG. 2B the decoder 100 comprises a decoder module 101 and an I/O interface 103. The decoder module 101 performs the actual decoding of the encoded data received by the decoder 101 and controls memory access and decoded frame output. The I/O interface 103 is responsible for interfacing between the decoder module 101, an MPEG2 encoded data source, the memory 201 and the I-P converter 210.

The I-P converter 210 of the present invention comprises an I/O interface 203 and an I/P conversion module 201.

The I-P converter's I/O interface 203 is responsible for interfacing between the components of the I-P conversion module 211, the decoder 100, the memory 201 and for outputting the generated sequence of progressive images. The I/P conversion module 211 includes a motion detector 205 and an interpolator 207.

The motion detector 205 is responsible for generating an estimate of the motion between a portion of the current frame being processed and a corresponding portion of a preceding or subsequent frame. Different motion estimates may be generated for each pixel of an image. The factor K is produced as a function of the motion detected by the motion detector 205. The generation of the value k will be discussed in detail below.

The interpolator 207 generates one set of progressive image data from each interlaced frame supplied thereto. The input interlaced frames normally comprise first and second images in the form of fields 1 and 2. The generated progressive images include the image data from one of the first and second fields and interpolated data generated by the interpolator 207 using motion compensated interpolation. Normally, in a progressive image sequence, the data from the same field, e.g., field 1 or field 2, will be included in each progressive image for consistency. The remaining progressive image lines, e.g., odd or even horizontal lines, are generated through interpolation.

MPEG2 decoding and I-P conversion will now be described briefly to facilitate understanding of the invention.

Figure 3:
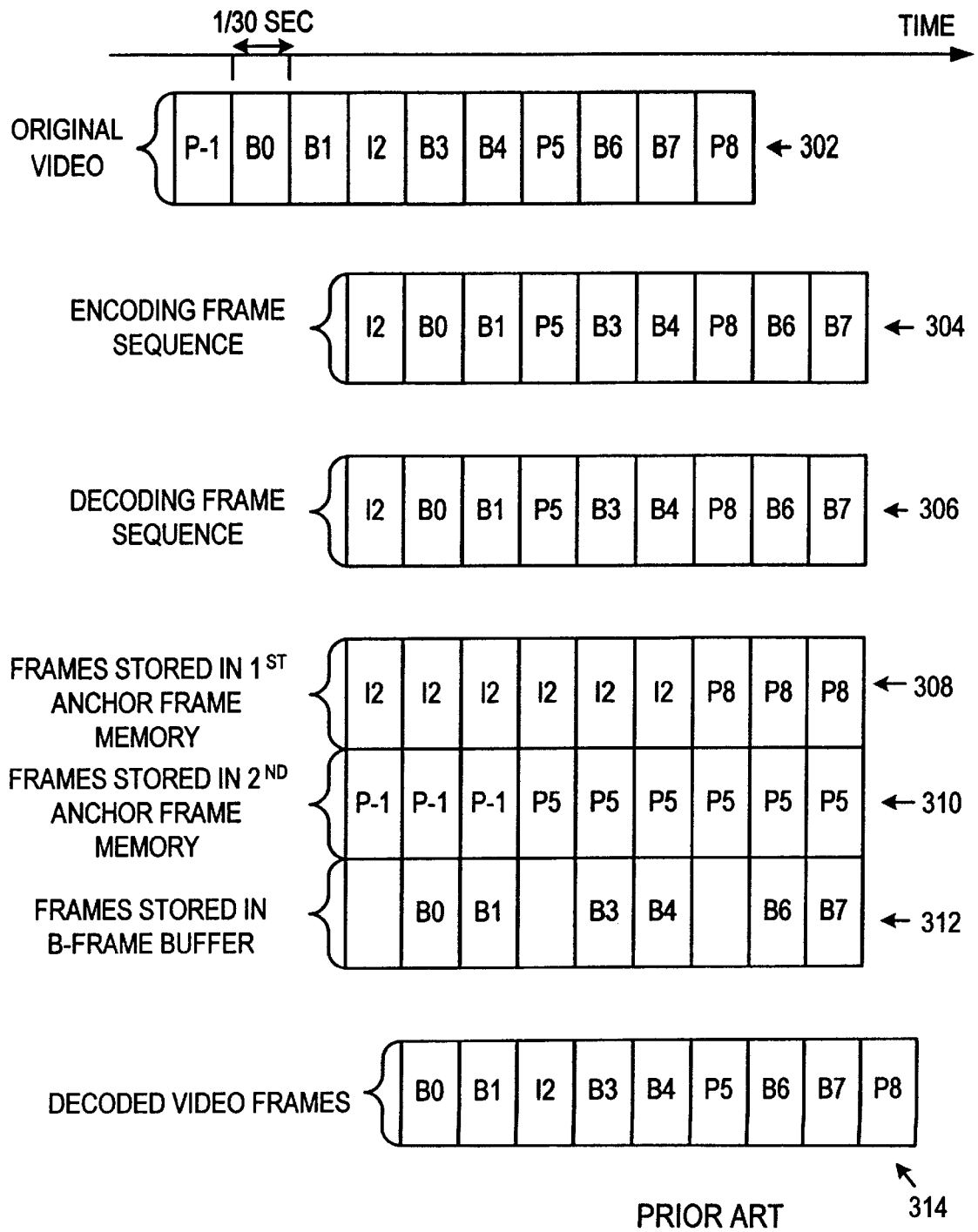
FIG. 3 illustrates the order in which various frames are stored in memory, processed, and output as part of various encoding and decoding operations.

The process order for conventional MPEG-2 decoding is shown in FIG. 3, where I indicates an intra-code frame, P is predictively coded frame, and B is bi-directionally coded frame. The number following the letter I, P, B, represents the frame number in the illustrated sequence. In this example, M, the spacing between anchor frames, e.g., I and P frames, is three.

The original unencoded frame sequence is represented in FIG. 3 by row 302. During encoding, I and P frames are encoded first, then B frames are processed by using I and P pictures as anchor frames. An encoding frame sequence is illustrated in row 304. During decoding, order of frame processing is reversed as compared to the encoding process. I and P frames are first decoded. B frames are then decoded using the I and P frames as anchor frames. Row 306 illustrates a decoding frame sequence. Anchor frames are stored in the $1^{st}$ and $2^{nd}$ anchor frame memories 102, 104 for use as reference frames. In addition, B frames are temporarily stored in the B-frame buffer 106 so that they can be output in the proper decoded video sequence.

The content of a conventional decoder frame memories 102, 104, 106, at various times during the decoding process, is illustrated in rows 308, 310 and 312, respectively, in FIG. 3. Here, keep in mind that I and P frames are maintained in memory and decoded B frames are stored in memory until the next B frame is decoded. Once decoded, the decoded video is output in the same order as the original video 312 as illustrated in row 314.

Figure 4A:
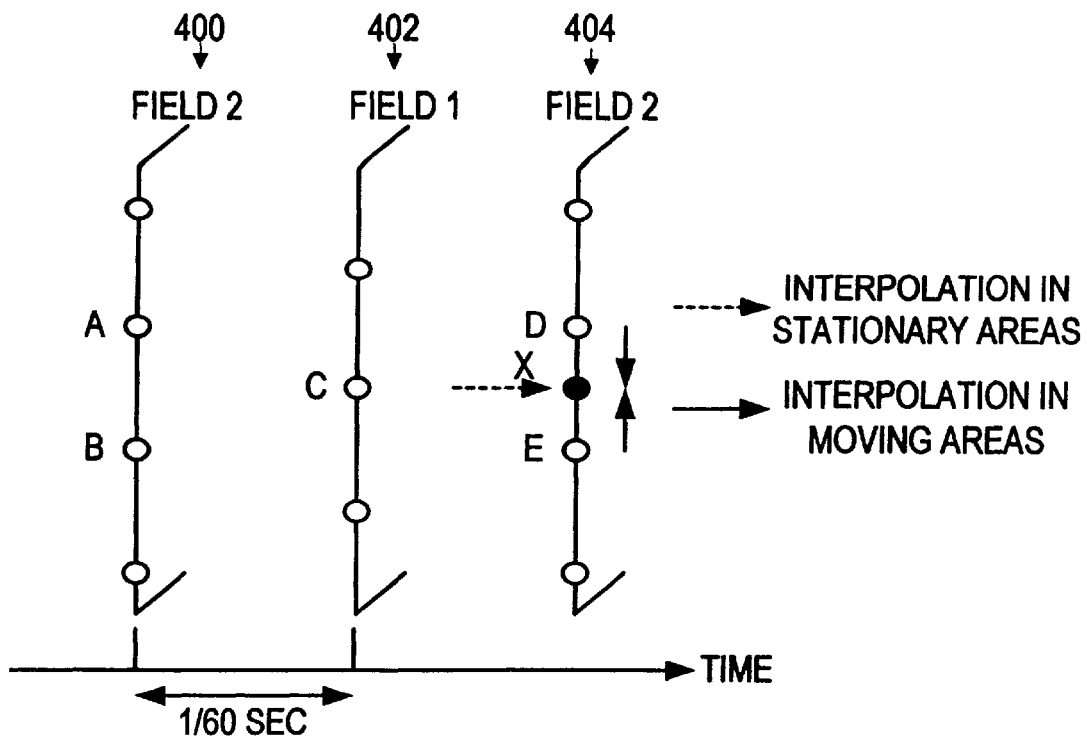
FIG. 4 illustrates methods of performing interpolation and motion detection in accordance with the present invention.

In accordance with one embodiment of the present invention, during I-P conversion two interpolation schemes are softly switched in accordance with detected motion, as shown in FIG. 4A. FIG. 4A shows how interpolated image data, e.g., pixel values X, are generated by performing interpolation using image data corresponding to fields 1 and 2 402, 404 of a current frame. In FIG. 4A, field 2 400 of a preceding frame is also shown. The interpolated image portion is represented by a solid dot. To generate a progressive image from fields 1 and 2 (402, 404) an image portion is interpolated between each of the field two image points, e.g., points D and E. The interpolated data along with the field 2 image data represents progressive image data having the same number of lines as a frame which comprises the combination of fields 1 and 2. Progressive image data may also be generated from field 1 by interpolating between the field 1 lines of pixel data. In accordance with the present invention, for each interlaced frame, a single set of progressive image data is normally produced comprising the data from field 1 or field 2 and a set of interpolated data. However, if desired, two progressive images can be generated, one including field 1 image data plus interpolated data and the other comprising field 2 image data plus interpolated data.

In the case where an interpolated pixel corresponds to a moving image portion, the pixel values X are determined according to the equation X=(D+E)/2 where D and E are the pixel values used to represent the field 2 pixels which are located above and below, respectively, the position for which interpolated data is being generated.

In stationary areas, inter-field interpolation is adopted when using interpolation to fill in portions of the image in order to improve vertical resolution. In such a case, the pixel values X are determined as being equal to the pixel value of the corresponding pixel of the other field in the same frame, e.g., X=C.

In moving areas, intra-field interpolation is adopted to prevent moving blur. In one embodiment, the static and motion based interpolation outputs are weighted with motion amount (k). Motion amount (K) is detected, e.g., measured, by calculating the difference in images one frame time apart, e.g., by measuring the change in pixel values between field 2 pixels from a preceding frame and corresponding field 2 pixel values from the current frame. That is, in one motion adaptive interpolation embodiment, $$X=[(K\times(D+E)/2)+((1-K)\times C)].$$

Figure 4B:
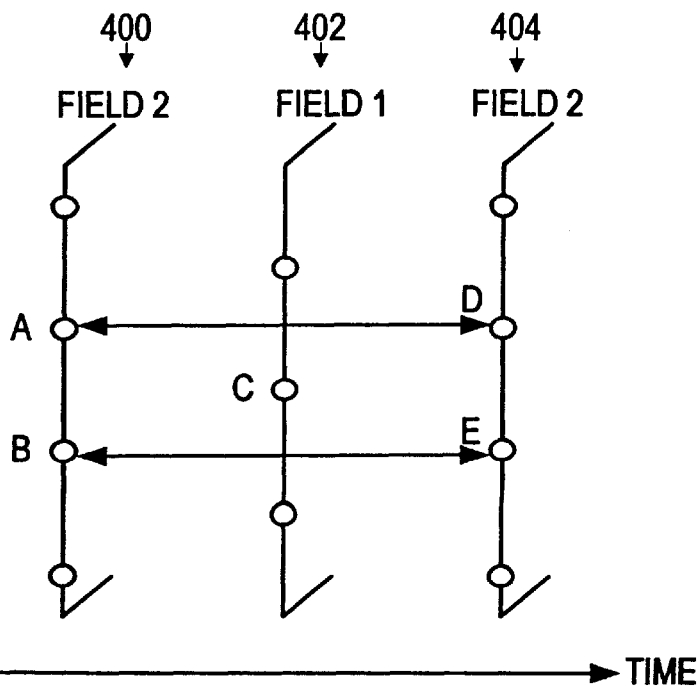

FIG. 4(b) illustrates the use of pixel values A and B from field 2 of the preceding frame and pixel values D and E of field 2 of the current frame for generating the motion amount K. In one embodiment, K is determined using the following equation: K=func(|D−A|+|E−B|); where K=0 for stationary images and K=1 for moving images.

Thus, the difference signal generated between the preceding and current frame values is normalized to a weighting coefficient, K (where K can assume values 0 through 1, $0 \leq k \leq 1$; K=0: stationary, K=1: moving).

Figure 5:
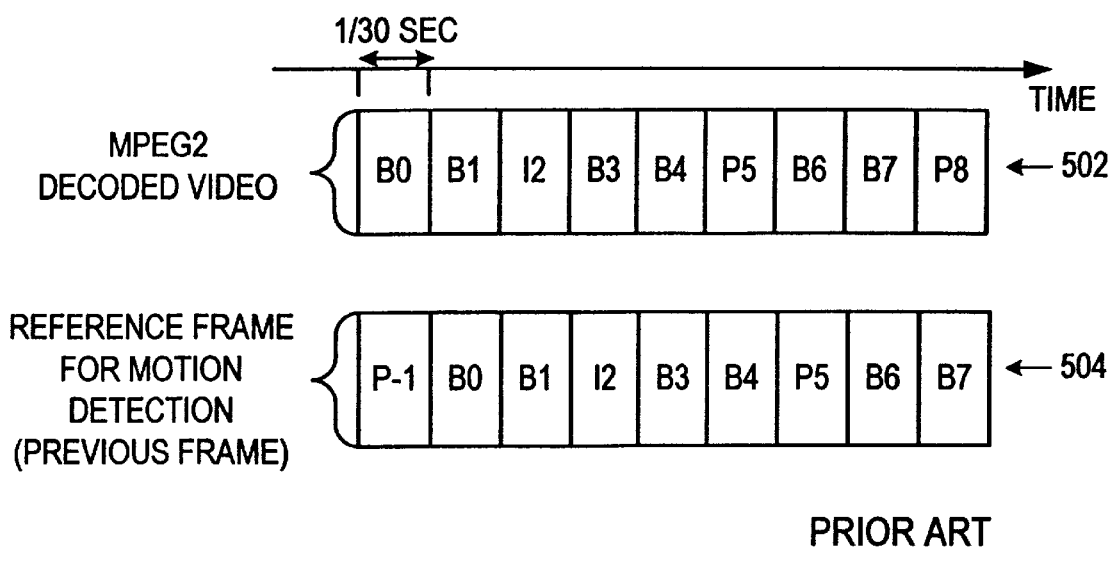
FIG. 5 illustrates a sequence of I, P and B frames included in decoded video, and the sequence of frames which are available in memory for use as reference frames during I-P conversion of the decoded video in accordance with the present invention.

FIG. 5 shows an MPEG 2 decoded video frame sequence 502 and a corresponding motion detection reference frame sequence 504. Each block in sequences 502, 504 represents a different frame, e.g., a frame which was previously coded as an I, P or B frame.

The known I-P conversion process uses one field memory for interpolation and one frame memory for motion detection. In actuality, a single frame memory can be used since a frame memory comprises two field memories. In the known system, when performing an I-P conversion operation on the decoded video frame in sequence 502, the frame in sequence 504, illustrated directly below the frame in sequence 502, would be stored in the frame memory 112. Note that in the prior art system, the frame preceding the frame upon which an I-P conversion operation is being performed, is used as the reference frame for motion detection purposes.

Figure 1:
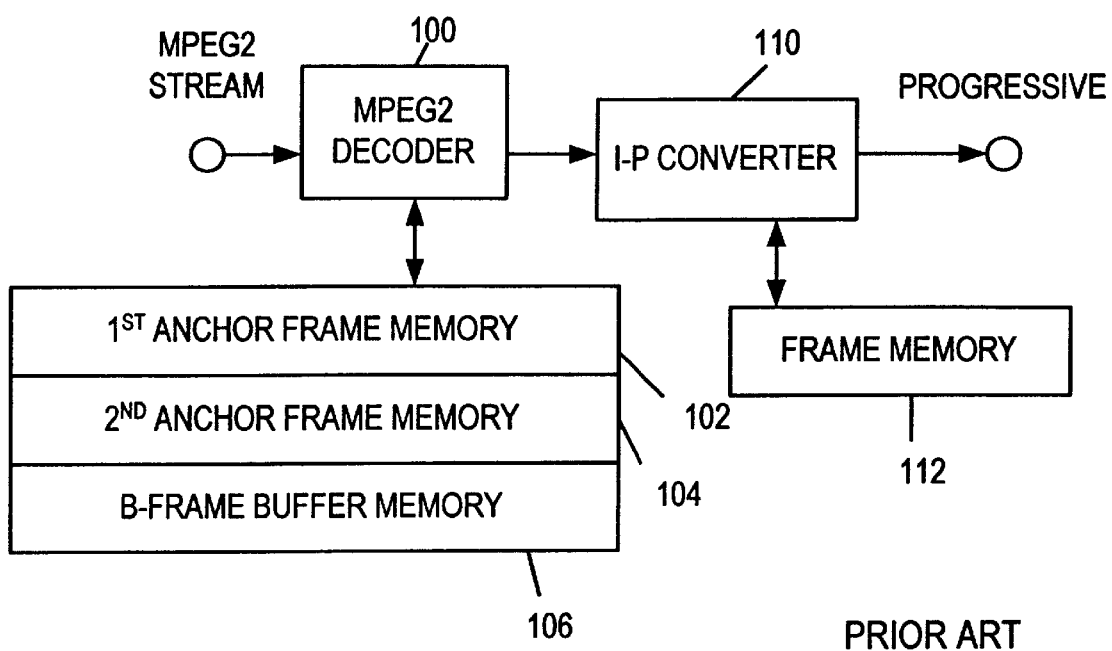
FIG. 1 illustrates a prior art MPEG2 decoder followed by a known I-P converter.

Thus, as discussed above, when MPEG2 decoding is combined, in the known manner illustrated in FIG. 1 with I-P conversion, three frame memories plus one additional frame memory for I-P conversion are normally used.

In order to reduce the total number of memories required to perform MPEG2 decoding and I-P conversion, the present invention uses the two following techniques: 1) Interpolation is executed in a frame comprising a pair of fields, i.e., field 1 and field 2 and 2) frames stored in memory for MPEG2 decoding purposes are used as reference frames for motion detection purposes. In accordance with the present invention frames which occur in the decoded video sequence prior or subsequent to the frame being converted to a progressive image may be used for motion detection purposes.

MPEG2 decoders normally process data on a frame basis and the resulting decoder output is a frame signal. In this invention, the interpolation is usually executed in a frame, a pair of two fields, field 1 and field 2. As a result of performing interpolation within a frame, an additional field memory is not necessary for interpolation since the frame memory used to store field 1 and field 2 for decoding purposes can be used to support inter-frame interpolation. As shown in FIG. 6A, in accordance with the present invention for inter-field interpolation in stationary areas, field 1 is interpolated from prior field 2 to create the progressive image 602. The image 602 includes original field 1 image data represented by circles with white centers and interpolated image data represented by solid circles.

In the case of applying interpolation to field 2, in stationary areas field 2 is interpolated from previous field I of the same frame to generate progressive image data 608, as illustrated in FIG. 6B. The image 608 includes original field 2 image data represented by circles with white centers and interpolated image data represented by solid circles. The key 610 illustrated in FIG. 6A is applicable to both FIGS. 6a and 6B. In moving areas, intra-field interpolation is used in FIGS. 6A and 6B.

As discussed above, frames are stored in memory by an MPEG decoder as part of the normal MPEG decoding process for use as reference frames when performing motion compensated prediction operations. The present invention uses these frames for motion estimation purposes during I-P conversion. Thus, the present invention uses frames stored at locations in memory for decoding purposes for I-P conversion purposes without copying or moving the frames from the location in memory where they are stored.

FIGS. 7, 8, 9 and 10 illustrate various timing diagrams and frame sequences which show how frames stored in the common memory 201, used by the decoder 100, are also used by the I-P converter 210 of the present invention. In each of the diagrams of FIGS. 7, 8, 9 and 10, a time line is illustrated at the top of the Figure. Beneath the time line is an illustration 706, 806, 906, or 1006 of the decoding frame sequence, i.e., the sequence in which frames are decoded. Beneath the illustration of the decoding frame sequence is an illustration of the sequence of frames 708, 808, 908 or 1008 stored in the $1^{st}$ anchor frame memory, an illustration of sequence of frames 710, 810, 910, or 1010 stored in the $2^{nd}$ anchor frame memory 204, and an illustration of the sequence of frames 712, 812, 912, and 1012 stored in the B-frame buffer 206.

The sequence of decoded frames 714, 814, 914 or 1014, generated by decoder 100, is illustrated below the frame buffer content sequences. The sequence of progressive frames 716, 816, 916 or 1016 generated by the I-P conversion circuit 210 and the sequence of reference frames 717, 818, 918 or 1018 used for I-P conversion motion detection purposes is also illustrated.

In each of FIGS. 7–10, the various illustrated sequences are time aligned so that each vertical column corresponds to the same time period.

Figure 7:
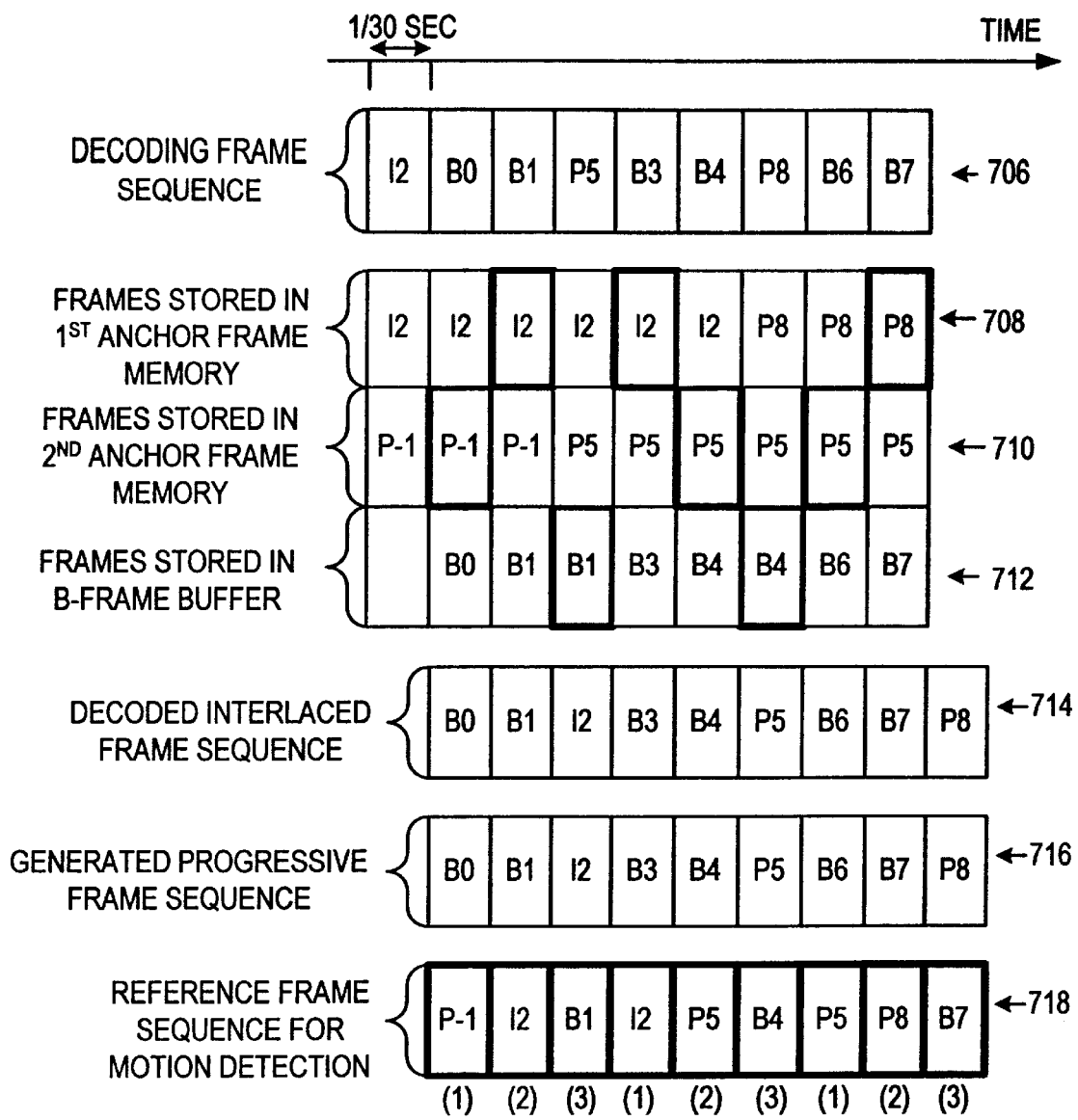
FIGS. 7–10 illustrate the sequence in which frames are stored in memory and used for decoding and I-P conversion purposes for embodiments having various anchor frame spacings.
Figure 8:
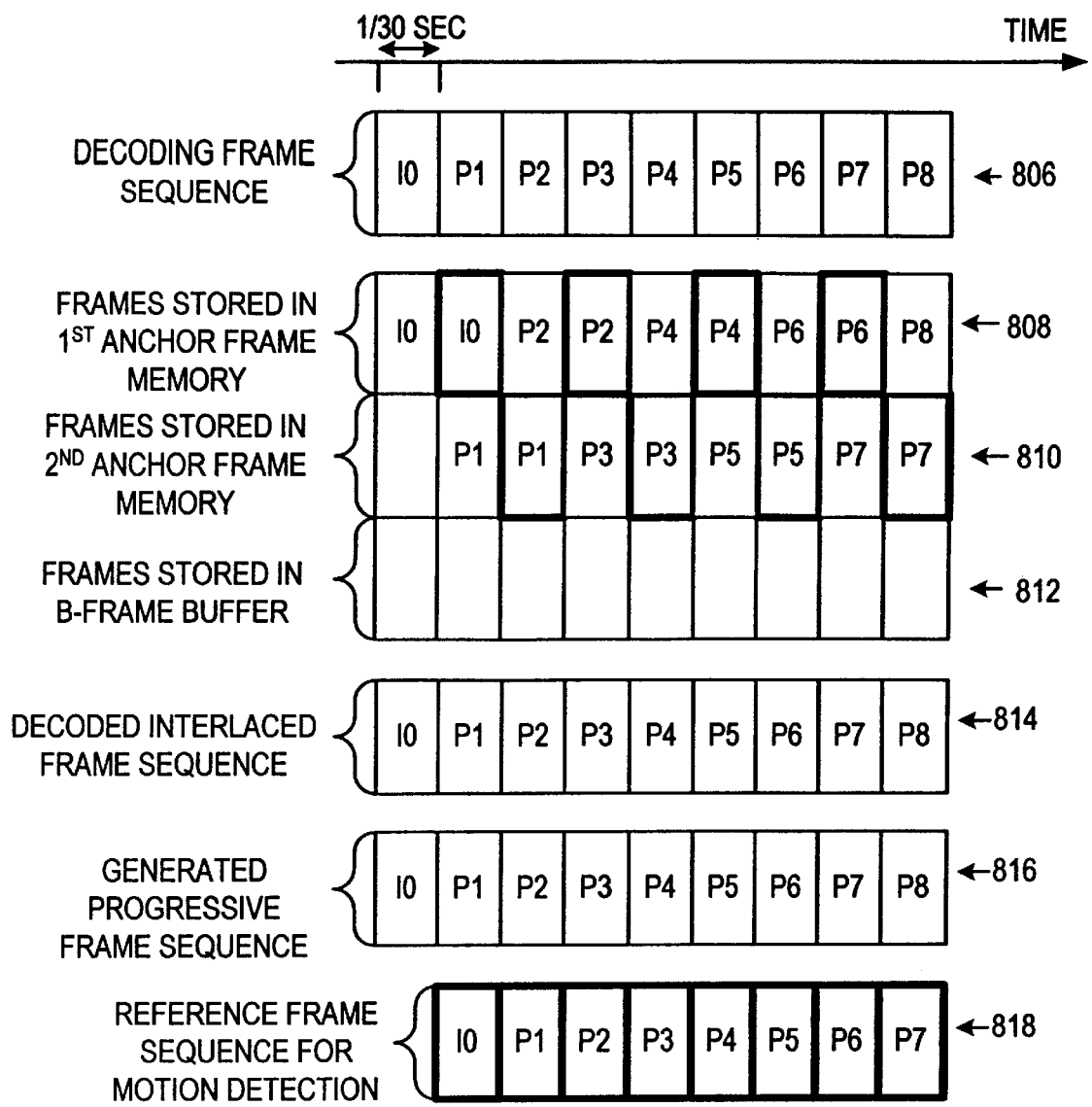
Figure 9:
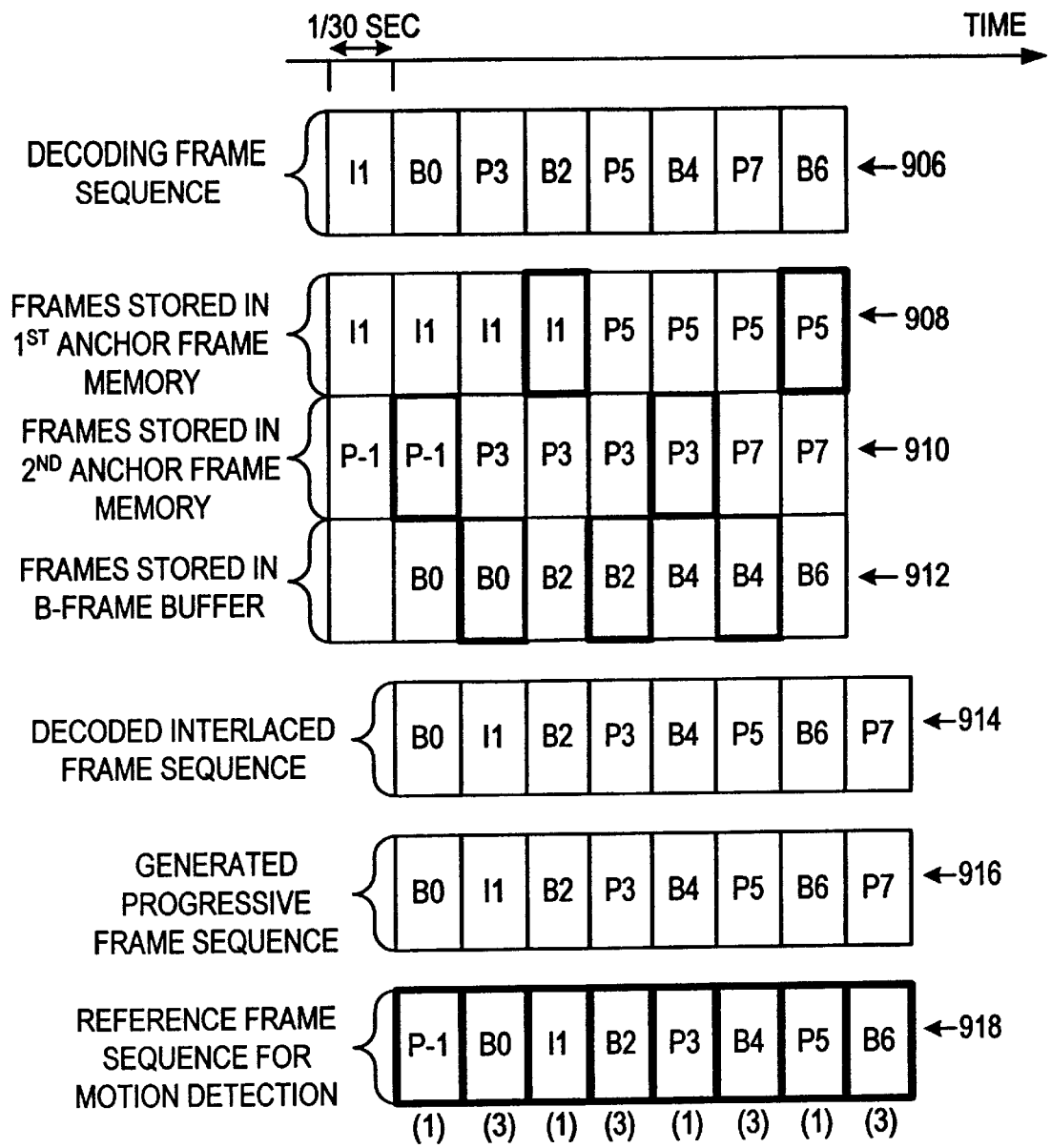
Figure 10:
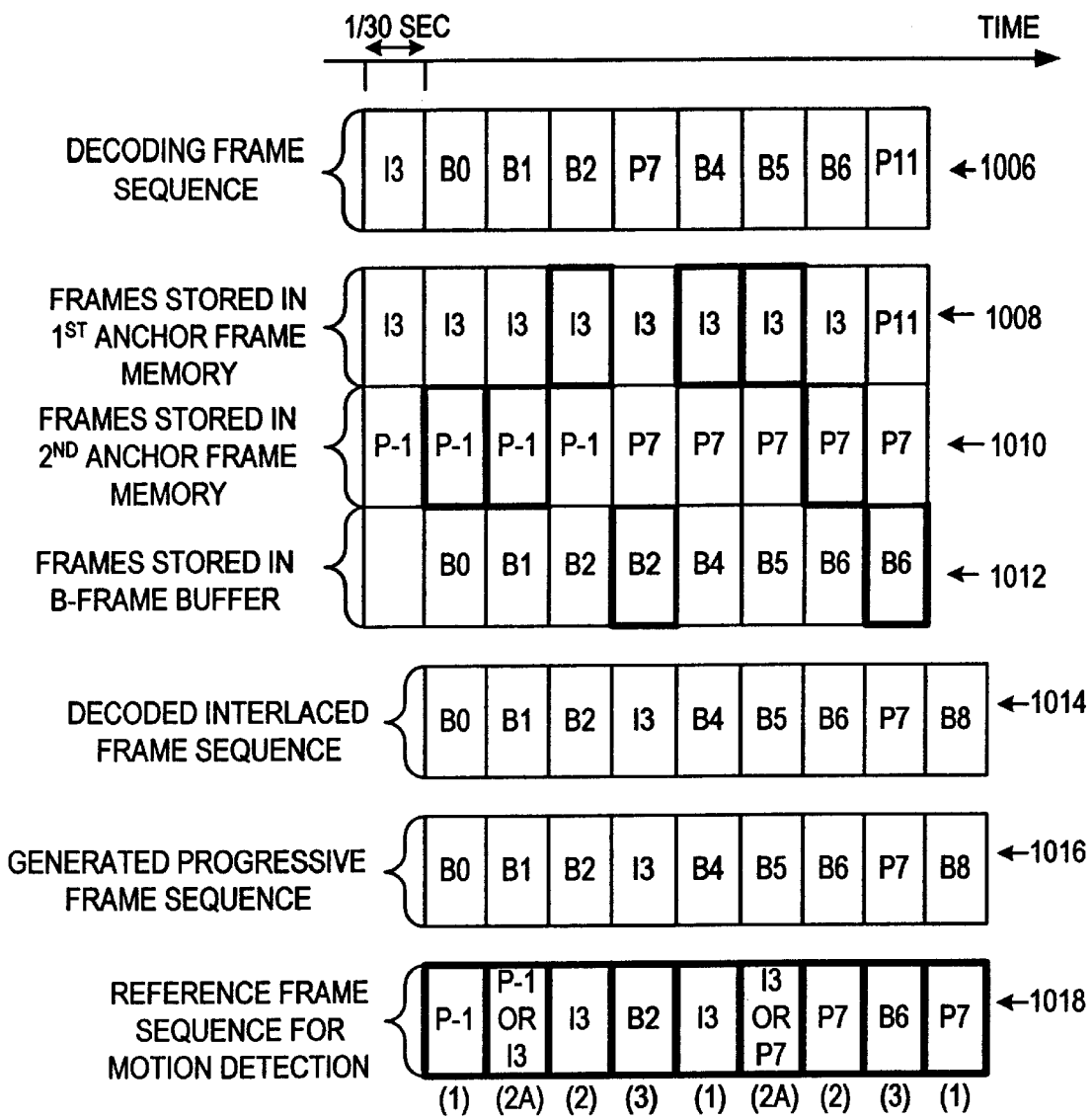

FIG. 7 illustrates I-P conversion where the spacing between reference frames (M) is limited to a maximum distance of 3 frames in a group of pictures. FIG. 8 illustrates I-P conversion where the maximum spacing (M) between reference frames is limited to a distance of 1 frame. In the FIGS. 9 and 10 illustration, M=2 and 4 respectively.

In FIGS. 7–10 decoded frames stored in the common memory 201 are used, in accordance with the present invention, for motion estimation purposes during I-P conversion. The frames used for motion estimation purposes are indicated through the use of bold boxes.

I-P conversion as illustrated in FIG. 7 will now be discussed in detail. The I-P conversion process involves the use of data corresponding to both previous and subsequent frames for motion detection purposes. In FIG. 7, the use of previous frame data is represented by a (1) below the generated progressive frame. The I-P conversion process also involves the use, in accordance with the present invention, of data from a subsequent frame for motion detection purposes. In FIG. 7, the use of subsequent frame data is represented by a (2) beneath the generated progressive frame. In some cases, a previous B frame is temporarily retained in the B-frame buffer and used for motion estimation purposes, beyond the time required for proper ordering of the decoded video. Such instances are indicated in FIG. 7 by a (3).

In FIG. 7 consider generated progressive frame B3. I2, which occurs previous to B3 in the decoded video sequence, is in memory 201 at the time the I-P conversion process is performed to generate progressive frame B3. Thus, I2 can and is used as a reference frame for motion estimation purposes when generating progressive frame B3.

Next in the generated sequence of progressive frames is B4. B3, previous to B4, is not present in memory, however P5 is present in the common memory, as a result of decoding, at the time I-P conversion is performed to generate progressive frame B4. Note that P5 is subsequent to B4 in the decoded video sequence. One frame difference, for motion estimation purposes can be calculated by subtracting P5 data values from corresponding B4 data values. Thus, in the FIG. 7 embodiment, the subsequent frame P5 is used for motion estimation purposes. P5 occurs next in the sequence of generated progressive frames. During normal MPEG decoding, the frame memory 201 would not include an appropriate reference frame if the memory contents were limited to what was required for MPEG decoding and frame re-sequencing. In this invention, an appropriate reference frame for I-P motion estimation purposes is retained in memory beyond the point necessary for MPEG-2 decoding purposes. In this particular example, B4 is retained in the buffer 106 for motion estimation purposes. Data values of P5 minus data values of B4 provide a one frame difference signal used for motion estimation purposes when generating progressive frame P5.

The remaining processing is a repetition of the same sequence, (1), (2) and (3) as shown in FIG. 7. Note that motion detection at B frames, in the FIG. 7 embodiment, uses the nearest anchor frame, and that motion detection at I and P frames uses a B frame found in memory 201.

As discussed above, FIG. 7 shows the case of M=3 where M is the maximum distance between anchor frames. The I-P conversion techniques of the present invention described in regard to FIG. 7 can be used with other values of M. The cases of M=1, 2 and 4 are shown in FIGS. 8, 9, and 10, respectively.

In the case of M=1 illustrated in FIG. 8, during decoding the previous decoded frame is present in memory 201 at the time I-P conversion is performed. Accordingly, a previous frame in the decoded frame sequence, can and is used as a reference during I-P conversion in the case of M=1.

In the case of M=2, illustrated in FIG. 9, during I-P conversion of a B frame, the previous frame in the decoded frame sequence is stored in memory for use as an anchor frame. Accordingly, when performing I-P conversion on a B frame the preceding frame data is used for motion estimation purposes. In the case of I and P frames, B frames which are retained in memory in accordance with the present invention are used for motion estimation purposes.

FIG. 10 illustrates I-P conversion where M=4. In the case of M=4 or more, one frame difference is replaced by two or more frame differences for the motion detection performed with B frames. In FIG. 10, reference numeral (1) is used to indicate use of a previous frame for motion estimation purposes. (2A) is used to indicate the use of a previous or subsequent frame in the decoded video sequence for motion estimation purposes. Reference (2), on the other hand, is used to indicate the use of a subsequent frame for motion estimation purposes. (3) is used to indicated the use of a B frame that was retained in memory for motion estimation purposes.

In the case of all I frames (M=1), such as Motion JPEG, a decoded frame is kept in memory during the following single frame decoding cycle for motion estimation purposes. The present invention can be applied to field structure in the same manner.

The methods and apparatus of the present invention are also well suited for use in a variety of applications, including, e.g., digital video disk (DVD), digital television (DTV) and to the display of video on personal computers (PCs). Because the current PC scanning scheme is progressive, and many video applications include interlaced video, I-P conversion is extremely important to supporting many video displays on personal computers. The methods and apparatus of the present invention can be used in personal computer applications which involve processing video data encoded using motion compensation, e.g., MPEG2 data streams. In computer embodiments, the decoder and I-P conversion apparatus may be implemented through the use of software executed on one or more CPUs.

While the current TV scanning scheme is primarily based on the use of interlaced video, it may change in the future to progressive to increase the ease with which progressively scanned internet and PC materials can be displayed. In such a case, incorporation of the present invention into TVs can provide a cost effective way to support the display of previously encoded interlaced video, e.g., old television shows, by converting the video to a progressive video format prior to display.

What is claimed is:

1. A method of generating data representing a sequence of progressive images, from data representing a sequence of first, second and third interlaced frames, the data representing each interlaced frame including data representing a first field and a second field, the method comprising the steps of:

performing a first motion compensated interpolation operation to generate data representing a first progressive image from data representing the first interlaced frame, the motion compensated interpolation operation including making an estimate of the image motion between a portion of a field of the first interlaced frame and a corresponding portion of a subsequent interlaced frame in the sequence of interlaced frames and accessing a memory device used to store reference frame data used by a decoder to support motion compensated prediction operations to obtain from the memory device data representing said corresponding portion of a subsequent interlaced frame; and generating, by performing a second motion compensated interpolation operation, data representing a second progressive image from data representing the second interlaced frame, the motion compensated interpolation operation including the step of making an estimate of the image motion between a portion of a field of the second interlaced frame and a corresponding portion of a preceding frame in the sequence of interlaced frames.

2. The method of claim 1, further comprising the step of:

performing a third motion compensated interpolation operation, to generate data representing a third progressive image from data representing the third interlaced frame, the motion compensated interpolation operation including the step of making an estimate of the image motion between a portion of a field of the third interlaced frame and a corresponding portion of a preceding frame in the sequence of interlaced frames.

3. The method of claim 1, wherein the subsequent frame used to generate the first progressive image is the second interlaced frame.

4. The method of claim 3, wherein the preceding frame used to generate the second progressive image is the first interlaced frame.

5. The method of claim 4, wherein the preceding frame used to generate the third progressive image is the second interlaced frame.

6. A method of generating data representing a sequence of progressive images, from decoded data representing a sequence of first, second and third interlaced frames, the data representing each interlaced frame including data representing a first field and a second field, the method comprising the steps of:

performing a first motion compensated interpolation operation to generate data representing a first progressive image from data representing the first interlaced frame, the motion compensated interpolation operation including the step of making an estimate of the image motion between a portion of a field of the first interlaced frame and a corresponding portion of a subsequent interlaced frame in the sequence of interlaced frames;

performing a second motion compensated interpolation operation to generate data representing a second progressive image from data representing the second interlaced frame, the motion compensated interpolation operation including the step of making an estimate of the image motion between a portion of a field of the second interlaced frame and a corresponding portion of a preceding frame in the sequence of interlaced frames; and wherein the first interlaced frame is a first decoded bi-directionally coded frame, the second interlaced frame is a decoded intra-coded frame and the third interlaced frame is a second decoded bi-directionally coded frame.

7. The method of claim 1, wherein the first interlaced frame is a first decoded bi-directionally coded frame, the second interlaced frame is a decoded intra-coded frame and the third interlaced frame is a second decoded bi-directionally coded frame.

8. A method of generating data representing a sequence of progressive images, from decoded data representing a sequence of first, second and third interlaced frames, the data representing each interlaced frame including data representing a first field and a second field, the method comprising the steps of:

performing a first motion compensated interpolation operation to generate data representing a first progressive image from data representing the first interlaced frame, the motion compensated interpolation operation including the step of making an estimate of the image motion between a portion of a field of the first interlaced frame and a corresponding portion of a subsequent interlaced frame in the sequence of interlaced frames;

performing a second motion compensated interpolation operation to generate data representing a second progressive image from data representing the second interlaced frame, the motion compensated interpolation operation including the step of making an estimate of the image motion between a portion of a field of the second interlaced frame and a corresponding portion of a preceding frame in the sequence of interlaced frames; and wherein the step of performing a second motion compensated interpolation operation includes the step of accessing a buffer memory used to store B frames when decoded frames are being re-ordered for decoder output, to obtain from the buffer memory data representing said corresponding portion of a preceding interlaced frame.

9. A system for generating data representing a sequence of progressive images from data representing a sequence of encoded interlaced images, comprising:

a memory device for storing data representing decoded interlaced images;

a decoder, coupled to said memory device, for decoding data representing the sequence of encoded interlaced images including at least one P frame or B frame using decoded image data stored in the memory device as reference data for motion compensated prediction purposes when decoding at least some predictively coded data corresponding to said at least one P frame or B frame; and an interlaced to progressive image converter, coupled to said memory device for converting decoded interlaced image data produced by the decoder into a series of progressive images, the interlaced to progressive image converter including motion detection means for detecting image motion using data corresponding to an interlaced image from which a progressive image is being generated and at least some of the decoded image data stored in the memory device for motion compensated prediction purposes when decoding at least some predictively coded data corresponding to said at least one P frame or B frame.

10. The system of claim 9, wherein the interlaced to progressive image converter further comprises:

a motion compensated interpolator for performing motion compensated interpolation operation as a function of the motion detected by the motion detecting means.

11. The system of claim 10, wherein the memory device comprises:

a first anchor frame memory; and a second anchor frame memory.

12. The system of claim 11, wherein the memory device further comprises a B frame memory.

13. The system of claim 11, wherein the means for detecting motion uses data corresponding to an image which occurs subsequent to the image from which a progressive image is being generated when performing at least one motion detection operation.

14. The system of claim 13, wherein the memory device further comprises a B frame memory for storing decoded interlaced images corresponding to data originally coded as a B frame.

15. The system of claim 14, wherein at least some of the B frame data is used for motion detection purposes after said at least some decoded B frame data is output by the decoder.

16. The system of claim 13, wherein the memory device further comprises a B frame memory of a size which is sufficient for storing decoded interlaced image data corresponding to decoded B frames for use in motion detection after said decoded B frame data is output by the decoder and supplied to the interlaced to progressive image converter.

17. A method of generating an image suitable for display using a progressive scan, from an interlaced image comprising first and second fields included in a sequence of fields, the method comprising the steps of:

performing an image decoding operation on encoded image data to generate decoded image data representing the first and second fields and at least one additional field in the sequence of fields;

storing the decoded data representing the first and second fields and the additional field in a memory device; and using the decoded data stored in the memory device corresponding to at least one of the first, the second and the additional field as reference data when performing a motion compensated prediction operation to decode a predicitively coded frame; and performing an interlaced to progressive image conversion processes using said decoded data, stored in the memory device, which was used as reference data when performing the motion compensated prediction operation, to generate said image suitable for display using a progressive scan.

18. The method of claim 17, wherein the step of using the decoded data stored in the memory device to generate said image includes the steps of:

estimating the amount of image motion between a portion of one of the first and second fields and the additional field; and performing an interpolation operation as a function of the estimated amount of motion.

19. The method of claim 18, wherein pairs of fields in the sequence of fields represent I, P and B frames arranged as a group of pictures, the first and second fields representing a frame; and wherein the additional field corresponds to a frame which is located in said group of pictures subsequent to the frame represented by the first and second fields.

20. A method of converting encoded data representing a predictively coded interlaced image comprising a pair of fields, into data representing a progressive image comprising a single field, the method comprising the step of:

decoding said encoded data by performing at least one motion compensated prediction operation using previously decoded data stored in a memory device as reference data, to produce decoded data representing at least a field of said interlaced image;

comparing data representing a portion of a field of said interlaced image to a corresponding portion of a field of another interlaced image included in said stored reference data to produce a motion estimate; and performing an interpolation operation to generate data representing a progressive image from said decoded data representing at least a field of said interlaced image and previously decoded data stored in said memory device as reference data, the interpolation being performed as a function of said motion estimate.

21. A method of converting data representing a series of interlaced images each comprising a pair of fields, into data representing a series of progressive images each comprising a single field, the method comprising the step of:

comparing data representing a portion of a field of a first interlaced image to a corresponding portion of a field of a second interlaced image to produce a first motion estimate, the second interlaced image occurring in said series of interlaced images subsequent to the first interlaced image;

using interpolation to generate data representing a progressive image from data representing one of the fields of the first interlaced image, the interpolation being performed as a function of the first motion estimate;

comparing data representing a portion of a field of a third interlaced image to data representing a corresponding portion of a field of a fourth interlaced image to produce a second motion estimate, the second interlaced image occurring in said series of interlaced images prior to the fourth interlaced image; and using interpolation to generate data representing an additional progressive image from the data representing one of the fields of the third frame, the interpolation being performed as a function of the second motion estimate.

22. The method of claim 21, wherein the data representing the progressive image includes interpolated data and the data representing the first field of the first frame; and wherein the data representing the additional progressive image includes interpolated data and the data representing the first field of the third frame.

23. The method of claim 21, wherein the data representing the progressive image includes interpolated data and the data representing the second field of the first frame; and wherein the data representing the additional progressive image includes interpolated data and the data representing the second field of the third frame.

24. The method of claim 21, further comprising the step of:

operating a decoder to decode encoded data representing the series of images, the step of operating a decoder including the step of storing in a memory device decoded reference frame data for use in performing motion compensated prediction operations during decoding and storing decoded B frame data to buffer said data; and wherein the step of using interpolation to generate data representing a progressive image from one of the fields of the first frame, includes the step of using the decoded data that was stored in said memory for use as reference frame data.

25. The method of claim 24, wherein the step of using the decoded data that was stored in said memory includes the step of:

performing an image motion estimate.

26. The method of claim 21, wherein the interpolation used to generate data representing a progressive image is a motion compensated interpolation operation.

27. A method of converting data representing a series of interlaced images each comprising a pair of fields, into data representing a series of progressive images each comprising a single field, the method comprising the step of:

comparing data representing a portion of a field of a first interlaced image to a corresponding portion of a field of a second interlaced image to produce a first motion estimate, the second interlaced image occurring in said series of interlaced images subsequent to the first interlaced image;

using interpolation to generate data representing a progressive image from data representing one of the fields of the first interlaced image, the interpolation being performed as a function of the first motion estimate and;

wherein each pair of fields represents an I, P, or B frame.

* * * * *